United States Patent

Nomura et al.

[11] 4,061,262
[45] Dec. 6, 1977

[54] SELF-RUNNING ONE-SIDE WELDING FACILITIES

[75] Inventors: Hirokazu Nomura; Katsumi Tohno; Tomio Takahashi, all of Yokohama, Japan

[73] Assignee: Nippon Kokan Kabushiki Kaisha, Tokyo, Japan

[21] Appl. No.: 678,256

[22] Filed: Apr. 19, 1976

[30] Foreign Application Priority Data

| Apr. 22, 1975 | Japan | 50-54118[U] |
| Apr. 22, 1975 | Japan | 50-49531 |
| Apr. 23, 1975 | Japan | 50-56266[U] |
| Apr. 24, 1975 | Japan | 50-95127[U] |
| July 10, 1975 | Japan | 50-54119[U] |

[51] Int. Cl.² ............................................. B23K 5/22
[52] U.S. Cl. ...................................................... 228/50
[58] Field of Search ............... 228/25, 26, 37, 45, 228/46, 50; 219/158, 160

[56] References Cited

U.S. PATENT DOCUMENTS

| 2,043,020 | 6/1936 | Thiemer | 228/50 |
| 2,153,785 | 4/1939 | Williams | 219/160 |
| 2,205,002 | 6/1940 | Tripp | 219/160 |
| 2,413,103 | 12/1946 | Forbes | 228/50 X |
| 3,505,496 | 4/1970 | Morley | 228/50 X |

*Primary Examiner*—James L. Jones, Jr.
*Assistant Examiner*—Nicholas P. Godich
*Attorney, Agent, or Firm*—Flynn & Frishauf

[57] ABSTRACT

A one-side welding facility having means pushing up backing metals against the butting part of the welding edges is mounted on guiding rails which are attached by means of magnets to materials to be welded and suspended therefrom, the facility being self-running thereon by an electric motor included therein. A pair of front and rear links having a spring therebetween are provided on the facility to push up the backing metal against the butting part. Thus, well conditioned one-side welding is stably provided with ease.

9 Claims, 25 Drawing Figures

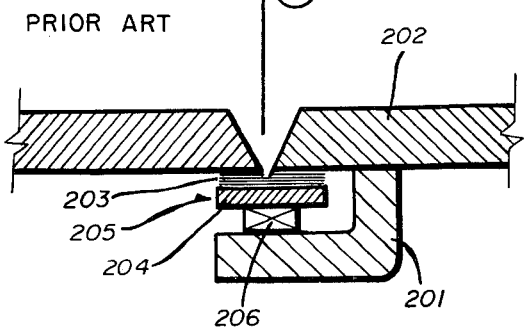
FIG_1 PRIOR ART
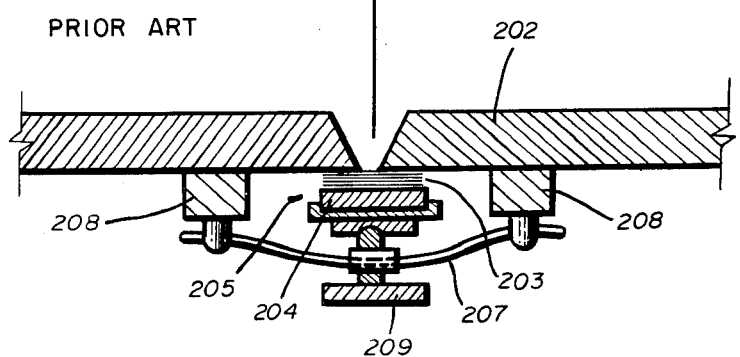
FIG_2 PRIOR ART
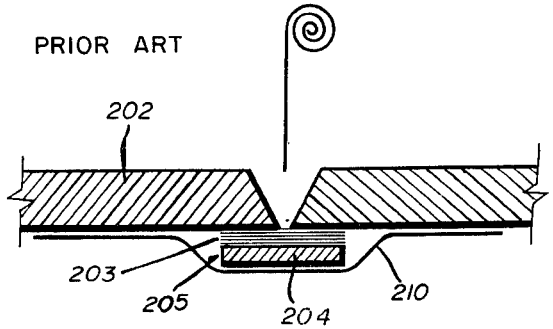
FIG_3 PRIOR ART

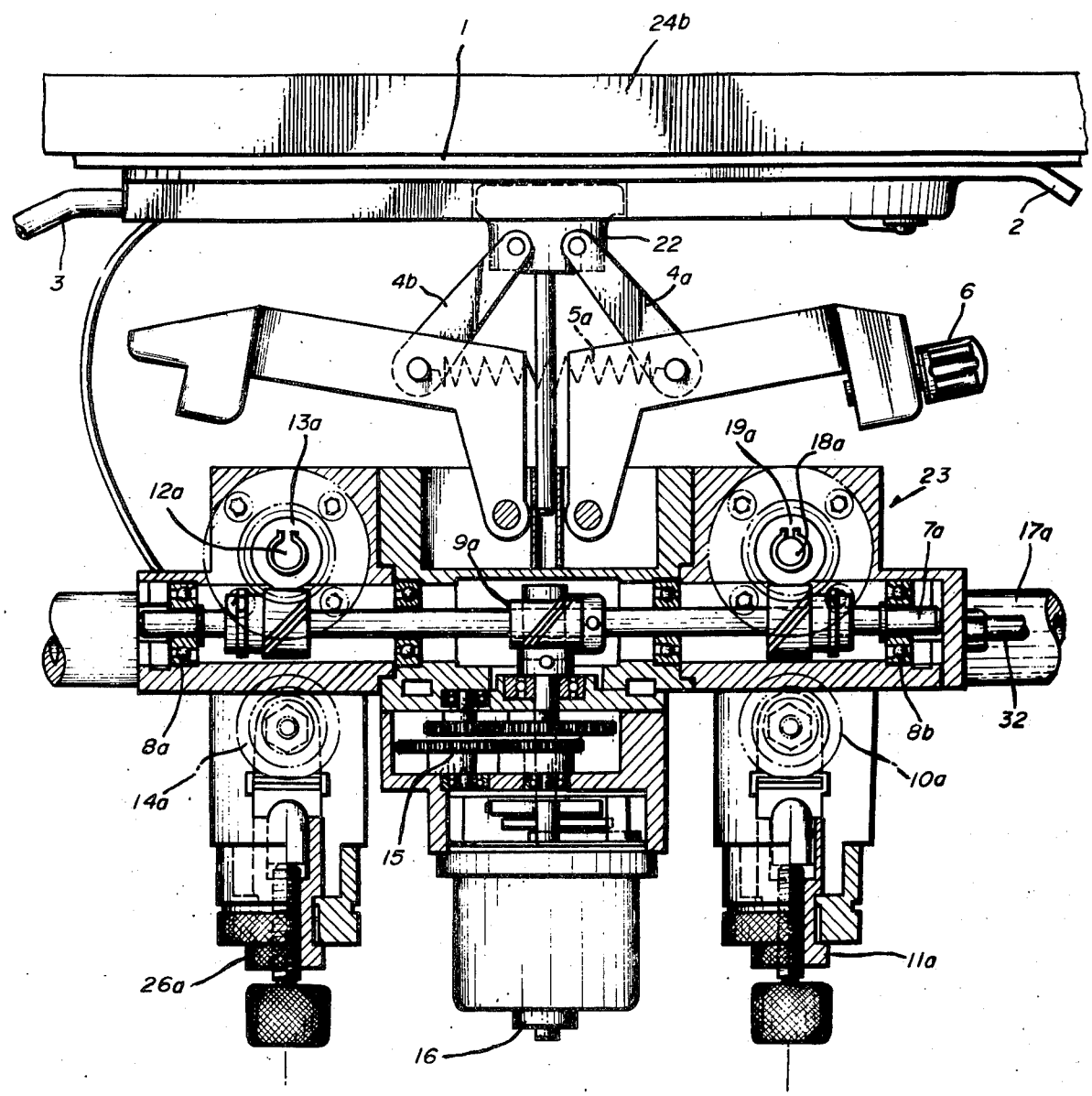
FIG_4

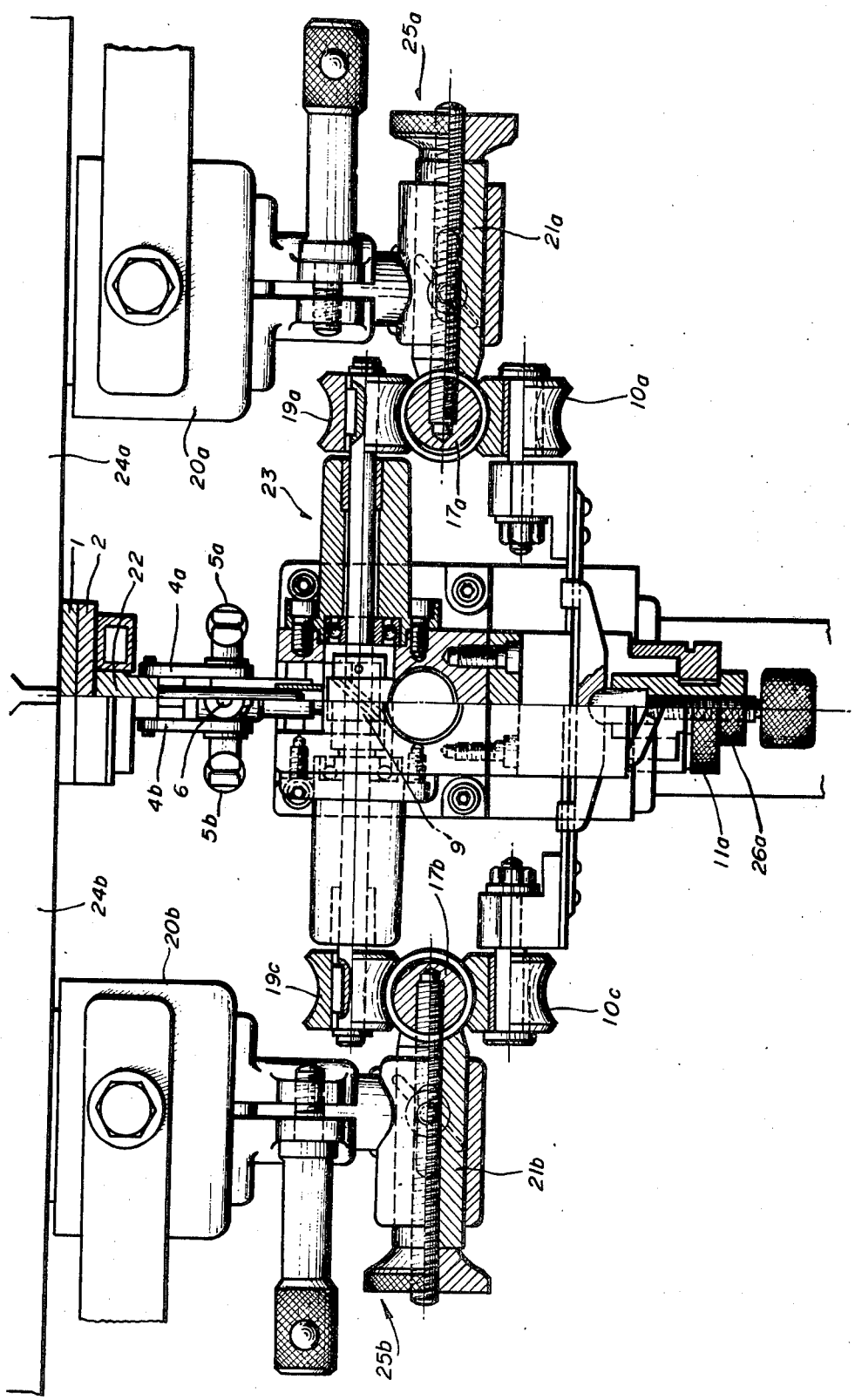
FIG_5

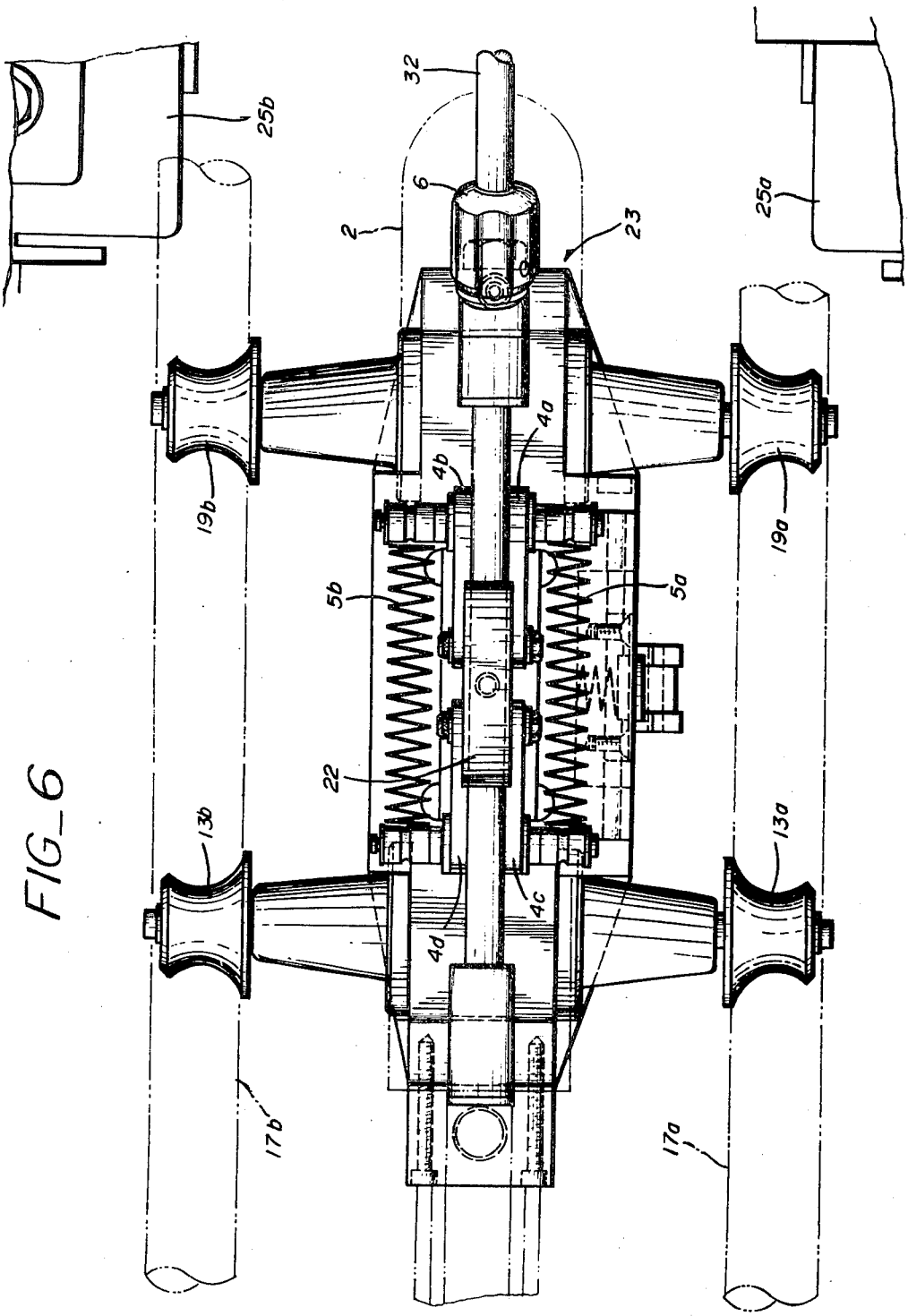
FIG_6

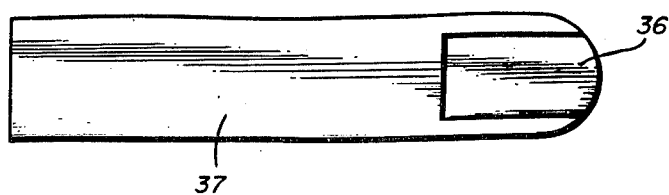
FIG_8
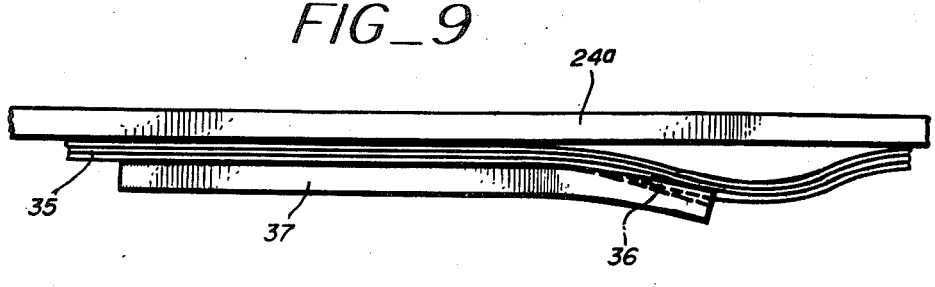
FIG_9
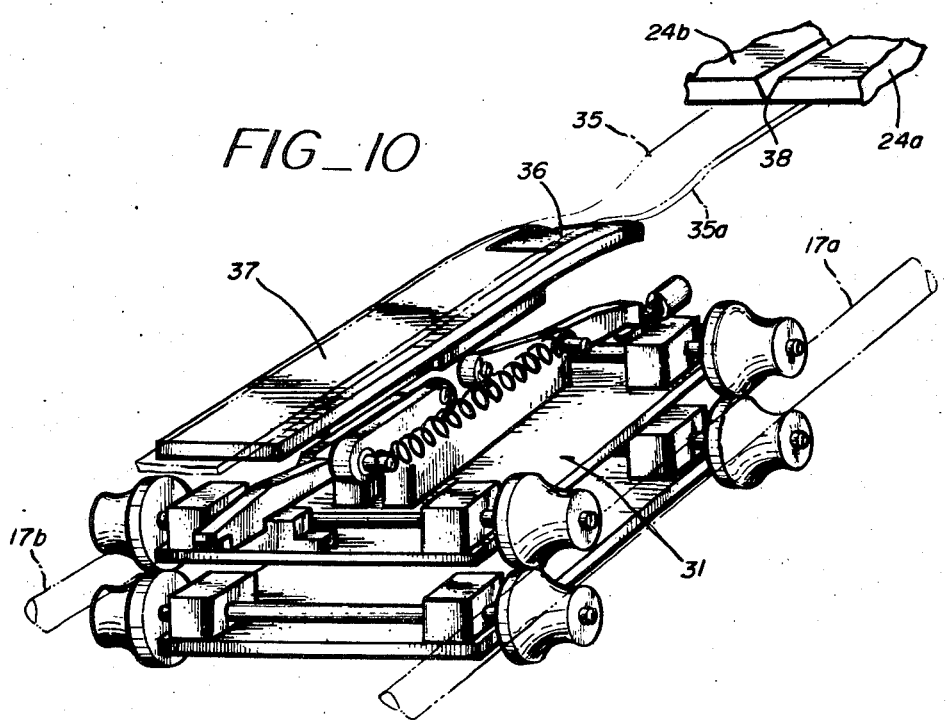
FIG_10

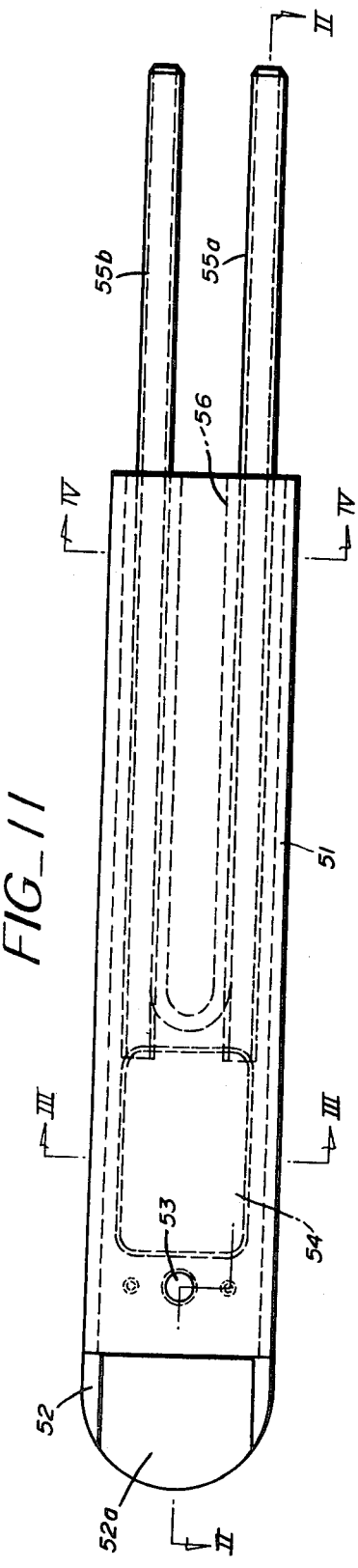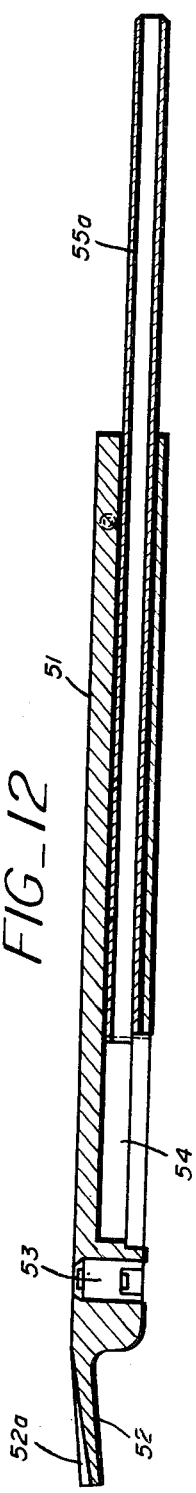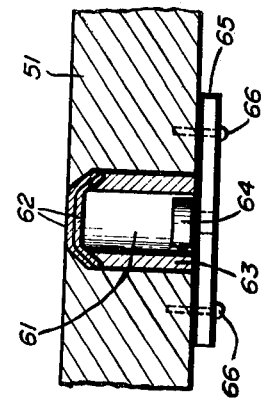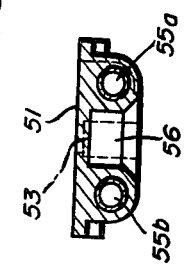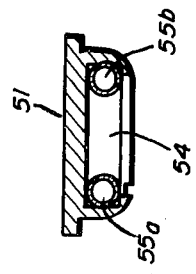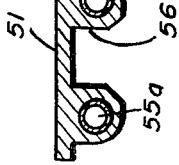

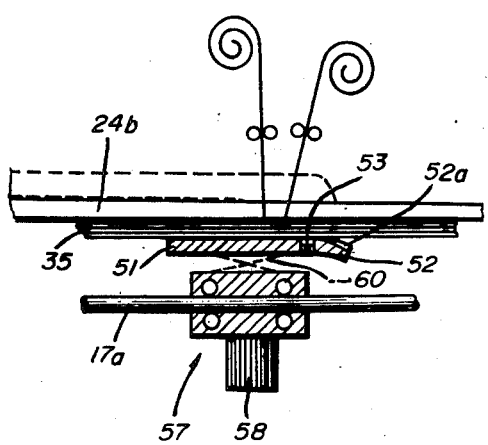
FIG_17
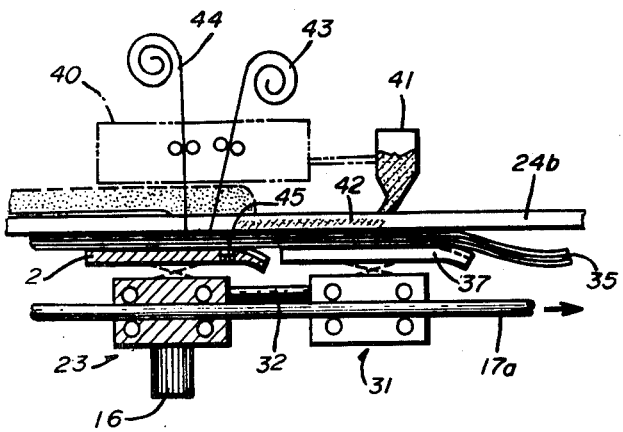
FIG_19
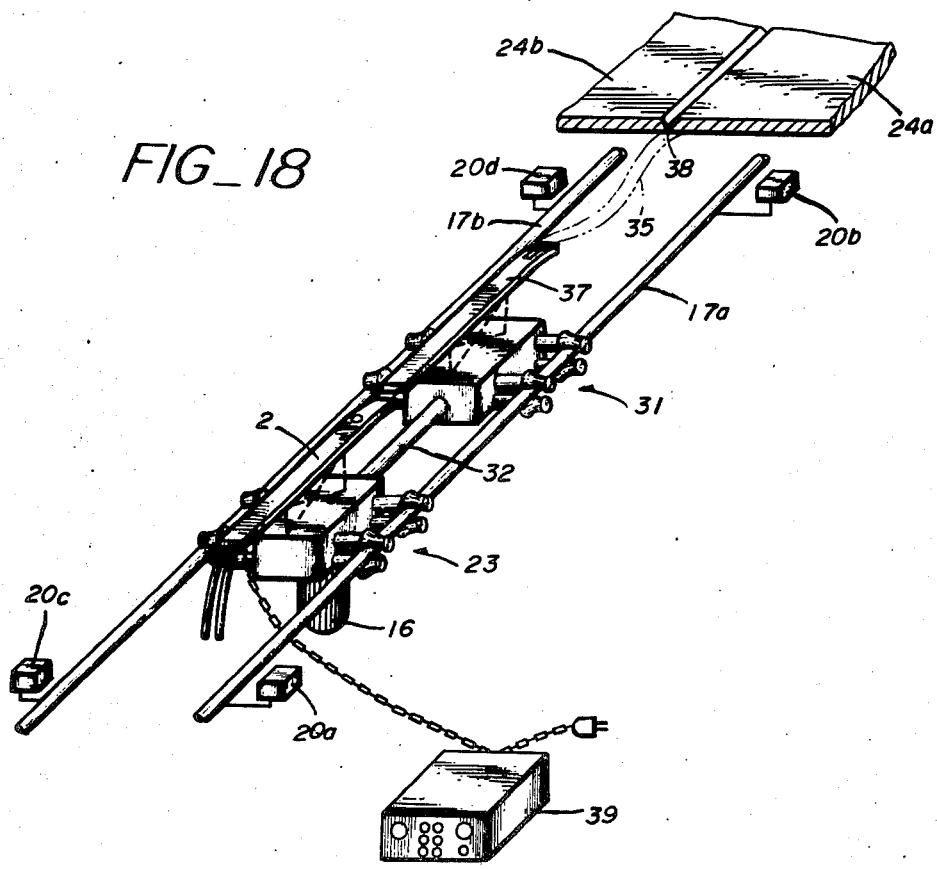
FIG_18

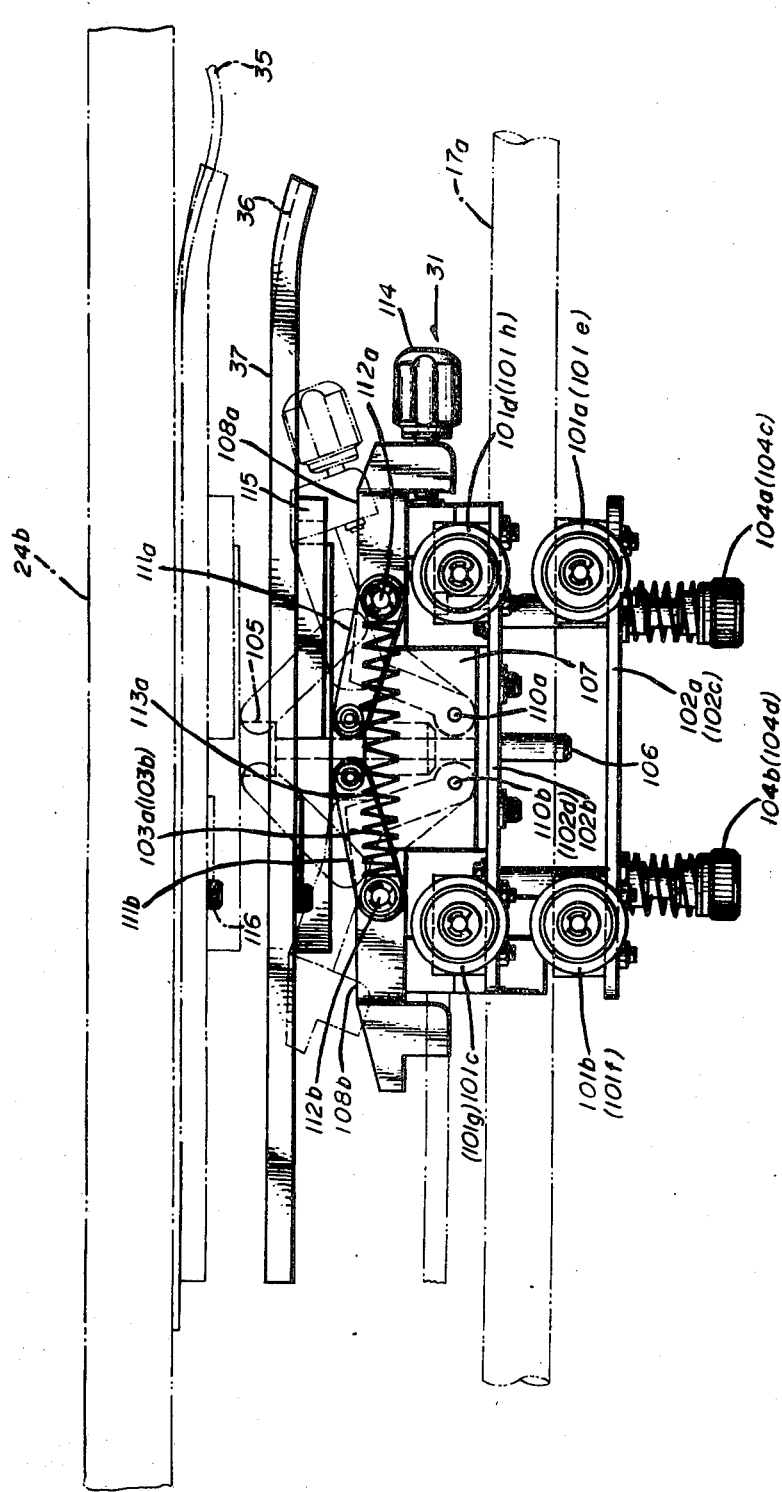
FIG_20

FIG_21
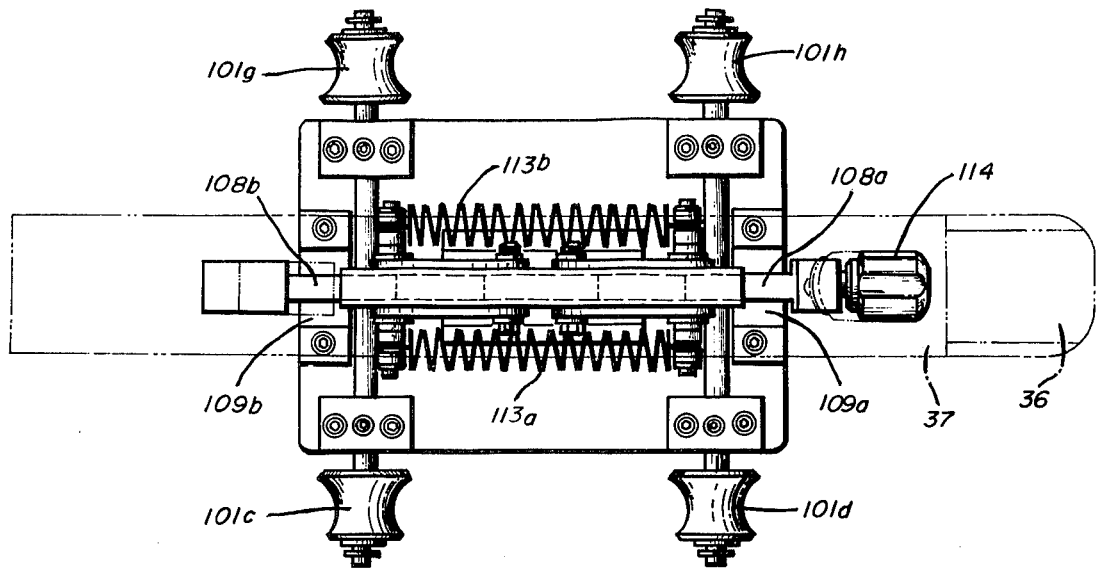
FIG_22
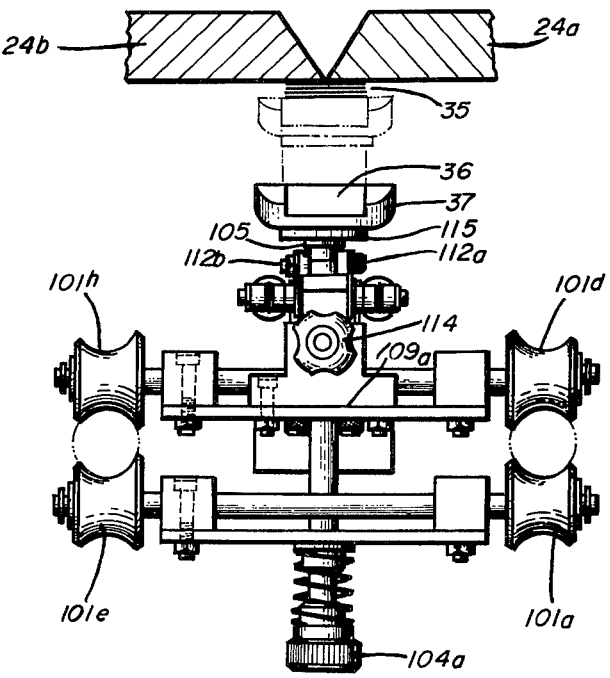

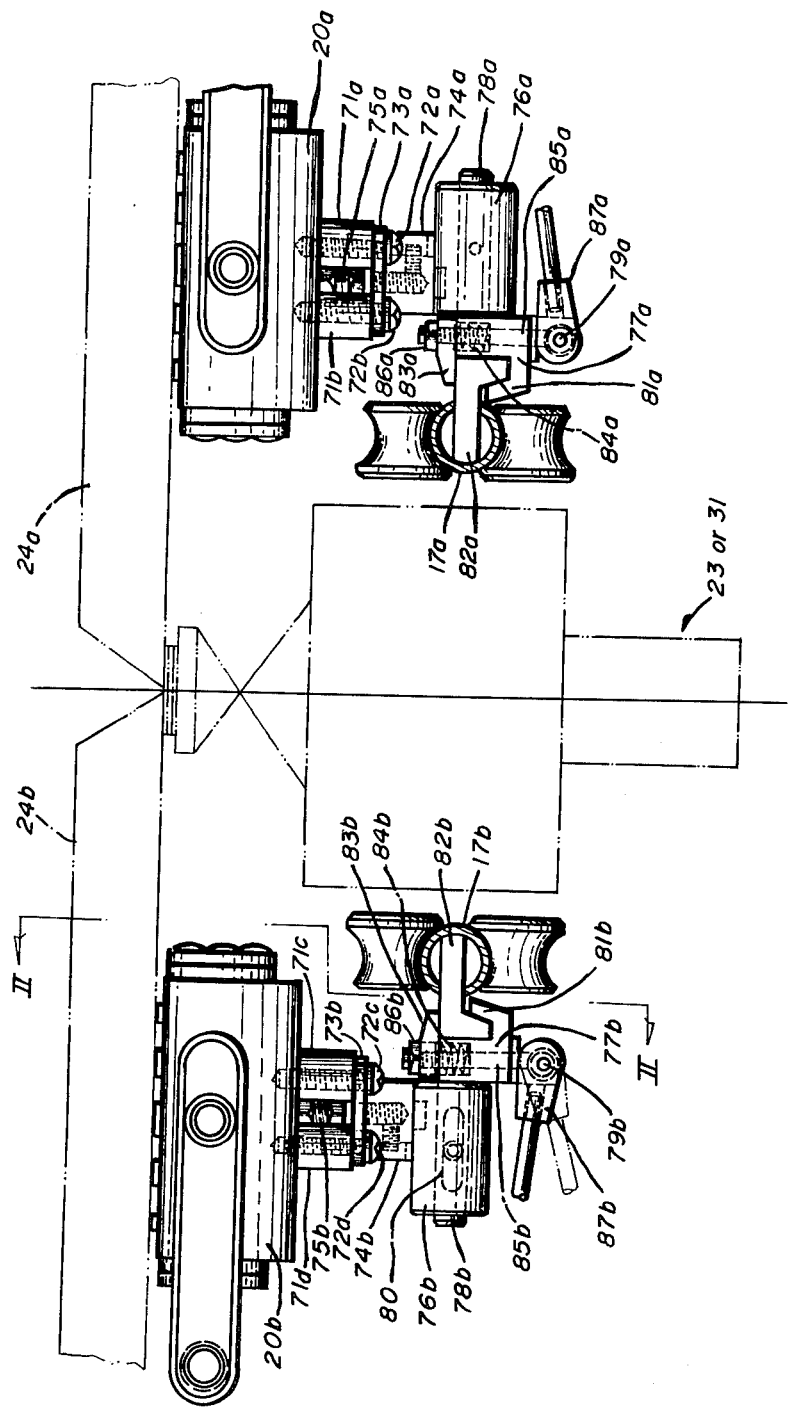
FIG_23

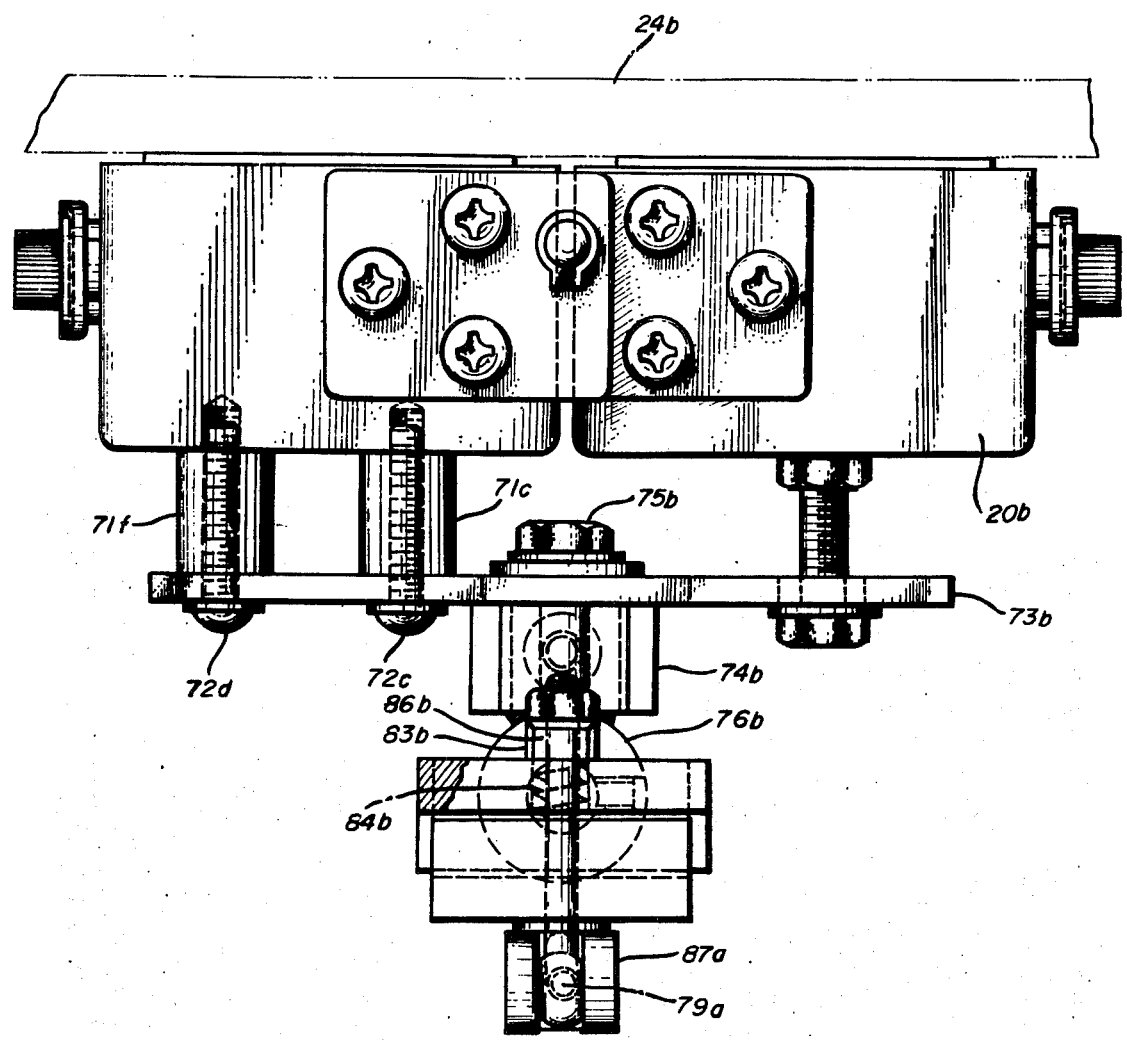
FIG_24

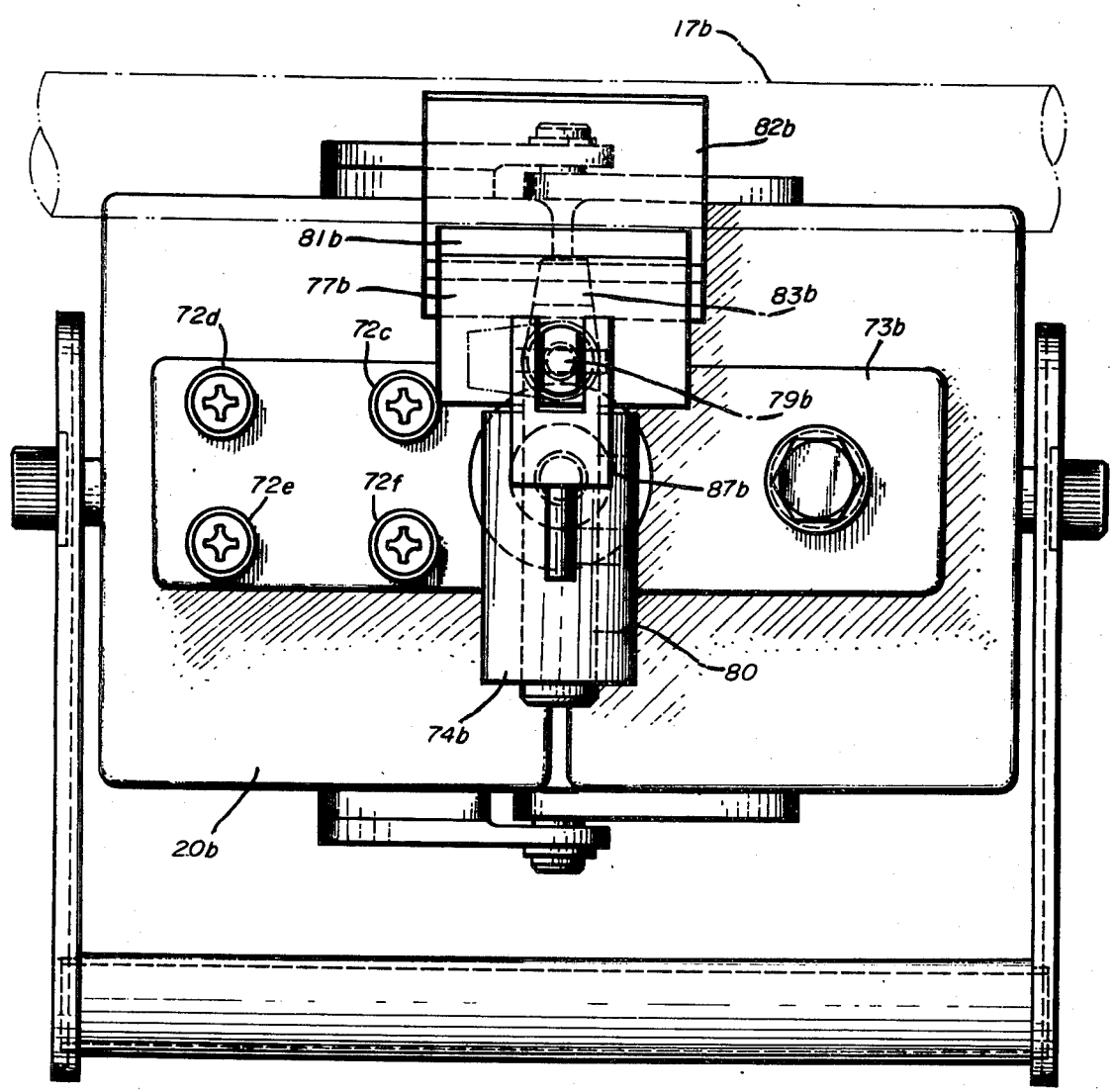
FIG_25

SELF-RUNNING ONE-SIDE WELDING FACILITIES

SUBJECT OF THE INVENTION

The invention is concerned with an improvement in one-side welding facilities having means pushing up the backing metals against the butting part of the welding edges, and especially to such facilities which are self-running.

BACKGROUND OF THE INVENTION

Various devices have been proposed or put in practice for the one-side welding apparatuses of the prior art. For example, an L-shaped piece is welded onto a material to be welded, and a glassfiber tape and a backing metal of copper plate are interposed therebetween to support a base metal. In this apparatus, there will be seen disadvantages that the L-shaped piece, which is in advance welded, is removed after the welding operation and the portion from which this piece has been removed must be repaired. Another conventional embodiment is that the material to be welded is attracted by two permanent magnets holding a spring plate therebetween over a welding line, and a screw pushing up this spring plate against the material to be welded is positioned at a center of the spring plate corresponding to a welding line so that the backing metal is attached to the welding line. There being about 200 to 300 mm of space between the magnets, problems arise in the cost owing to the necessary magnets, and moreover the magnetism decreases owing to rising of the temperature of the material to be welded by the input welding heat, and the magnets at last disadvantageously drop. A further conventional embodiment is that the backing metal is fixed to the material to be welded by means of a tape in the same manner as said above. Also in this case, the attaching force of the tape decreases by the welding temperature, and therefore it is inconvenient in actual practice. Difficulties prevailing in such conventional arrangements are that attaching and detaching of said members are not easy and movement of the apparatus is difficult. To date, however, no arrangement capable of overcoming these difficulties has yet been realized.

BRIEF DESCRIPTION OF THE INVENTION

The present invention has been devised to overcome the above mentioned difficulties. A basic feature of the invention resides in suspending the guide rails of the welding facilities from the material to be welded by attracting it by means of magnets, and the facilities of the motor driving system is mounted on these rails, which is provided with a pair of front and rear links having a spring therebetween to push up the backing metal against the butting portion of the welding edges.

A principle object of the invention is to offer a one-side welding facility which enables self-running together with the backing mechanism and pushing up mechanism.

Another object of the invention is to offer a facility which facilitates attaching and detaching of the operating members.

Other objects and advantages according to the invention will be apparent from the following description with reference to the accompanying drawings.

BRIEF DESCRIPTION OF THE DRAWINGS

FIG. 1 illustrates a backing mechanism and a pressing mechanism thereof in a prior art one-side welding apparatus, FIG. 2 illustrates another embodiment of the same, FIG. 3 illustrates a further embodiment of the same, FIG. 4 illustrates a side view showing a basis structure of an embodiment according to the invention.

FIG. 5 is a front view of the structure of FIG. 4,

FIG. 6 is a plane view of the structure of FIG. 4,

FIG. 8 is a plan view of an improved backing tape in the structure shown in FIG. 4, FIG. 9 is a front view of the arrangement of FIG. 8, FIG. 10 is an explanatory figure showing an embodiment of the backing tape in FIG. 8, FIG. 11 is a plan view of an improved backing metal in the structure shown in FIG. 4, FIG. 12 is a cross section taken along the line II—II of FIG. 11.

FIG. 13 is a cross section taken along the line III—III of FIG. 11.

FIG. 14 is a cross section taken along the line IV—IV of FIG. 11,

FIG. 15 is a rear view of the structure of FIG. 11,

FIG. 16 is a cross section showing details of an arc-detecting part,

FIG. 17 is a side view showing one example of the backing metal in FIG. 11,

FIG. 18 is a perspective view showing one embodiment of an improvement of the backing mechanism shown in FIG. 4, FIG. 19 is a side view of the embodiment of FIG. 18, FIG. 20 is a side view of the embodiment of FIG. 18, FIG. 21 is a plan view of the embodiment of FIG. 18, FIG. 22 is a plan view of the embodiment of FIG. 18, FIG. 23 is a front view showing one embodiment of an improvement of the guiding rails shown in FIG. 4, FIG. 24 is a side view taken along the line II—II of FIG. 23, and FIG. 25 is a bottom view of the embodiment of FIG. 23.

DETAILED DESCRIPTION OF THE INVENTION

Figure 7:
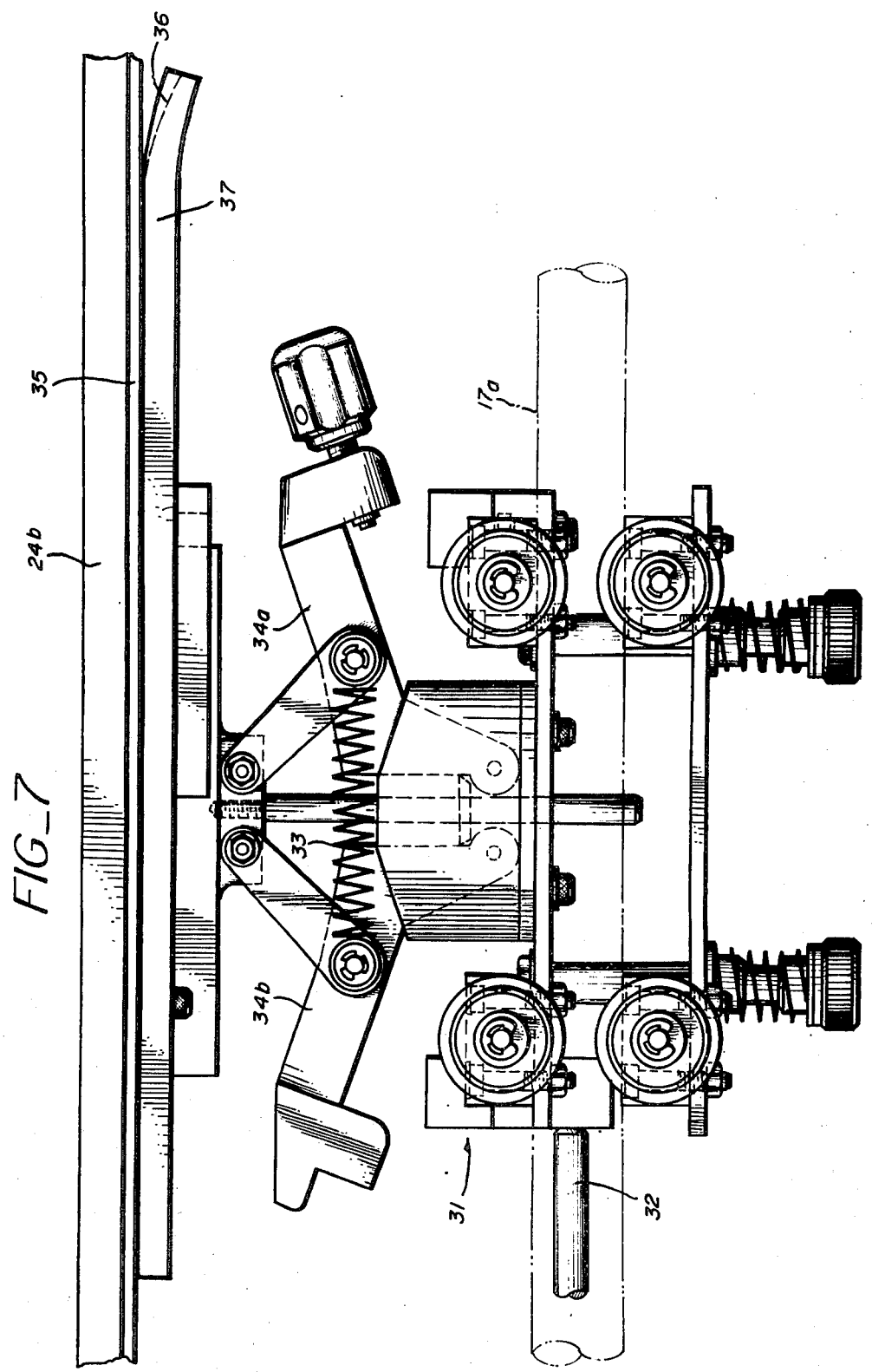
FIG. 7 is a side view of a guiding apparatus of a backing material, which is the most suitable for the structure shown in FIG. 4.

Various apparatuses have been proposed or put in practice for the prior one-side welding apparatus. FIG. 1 shows one example thereof, in which an L-shaped piece 201 is welded onto material to be welded 202, and glassfiber tape 203 and backing material 205 of copper plate 204 are interposed therebetween to support a metal 206. In this apparatus, there will be seen disadvantages that the L-shaped piece, which is in advance welded to material 202 is removed after the welding operation and the portion from which the piece has been removed must be repaired. FIG. 2 shows another prior art embodiment, in which the material 202 is attracted on its reverse side by two permanent magnets 208 having a spring plate 207 therebetween over a welding line. A pushing up screw 209 is positioned at the center of the spring plate 207 so that the backing metal 205 is attached to the welding line. There being about 200 to 300 mm of space between the magnets, problems arise in the cost owing to the necessary magnets, and moreover the magnetism decreases owing to rising of the temperature of the material to be welded by the input welding heat, and the magnets at last disadvantageously drop. FIG. 3 shows a further prior art embodiment, in which the backing metal 205 is fixed to the material to be welded 202 by means of a tape 210 in the same manner as described above. In this case, the attaching force of the tape decreases due to the welding temperature and therefore it is inconvenient to the actual welding operation. Difficulties common in those conventional arrangements are that attaching and detaching of said members are not easy and movement of the apparatus is difficult. If all of such difficulties were removed, utilization of such equipment would be inestimable. Unfortunately, equipment overcoming these difficulties has not yet been realized.

The present invention has been devised to overcome the above mentioned difficulties. Referring to FIGS. 4, 5 and 6, guide rail mechanisms 25a 25b comprise two guide rails 17a, 17b, a plurality of rail adjusting screws 21a, 21b to support the guide rails and magnets 20a, 20b for fixing the rails, so that the magnets 20a, 20b are attached to reverse sides of materials 24a, 24b to be welded to interpose the welding line therebetween. The adjusting screws 21a, 21b are adjusted to maintain a space between both rails at a desired value. A main body 23 of the backing apparatus is provided with an electric motor 16 at its center and provided at its front and rear sides with a front axis 12a having a front driving wheel 13a and a back axis 18a having a back driving wheel 19a for rotating in engagement with said guiding rails so that a driving shaft 7a for rotating said front and back wheels is engaged with said electric motor 16 via a switching device 9a, a reduction gear 15 and bearings 8a, 8b. A front free wheel 14a and back free wheel 10a are provided under said driving wheels 13a, 19a, and a front wheel pushing up screw 26a and a back wheel pushing up screw 11a are furnished under the front wheel 13a and the back wheel 19a to push up the respective free wheels 14a and 10a to the guiding rails 17a.

With respect to the backing mechanism, a pushing up piece 22 contacting to push up preferably with its curve a water cooling plate 2, preferably made of copper, having a cooling pipe 3a therein centrally of the main body, is rotatably equiped with links 4a, 4b for vertically moving said plate 2. One of the links is provided with a securing means 6 at its elongated end and a spring 5a is expanded between the links to adjust said pushing up force.

In the basic structure of the invention, a glassfiber tape 1 is contacted to the reverse side of the material to be welded at the portion of the material corresponding to a welding line, and said rail attaching magnets are positioned at the both sides of the material to be welded with respect to the welding line to keep a space between the rails at a desired value. Subsequently, the driving wheels 13a, 19a are mounted the guiding rails 17a, and the apparatus main body unscrewing the fixture 6 is movable by the motor 16 by pushing up the free wheels 14a, 10a and adjusting the screw 6. Then the cooling plate 2 is secured to the glassfiber 1 with the adjusting spring 5a. In this connection, attachment of the cooling plate 2 may be adjusted by selecting a spring force of the adjusting spring 5a. As above said, the apparatus is driven on the guide rails 17a by the motor 16 while keeping balanced attachment of the cooling plate 2 by means of the spring loaded links 4a, 4b, and therefore if the apparatus is driven at the same speed as the welding speed, the cooling plate 2 is slid smoothly and the reverse side bead is stably formed in a good condition easily in such a manner that the apparatus is positioned under the welding pool or solidifying pool to prevent dropping of the molten metal. In ths case, the backing material such an glassfiber is not required, and a sliding plate 2 may be directly attached below the material to be welded.

When the glassfiber tape 1 as shown in FIG. 4 is employed, attention should be given to a backing material guiding apparatus. Referring to FIG. 7, the material guiding apparatus 31 is pushed by a bar 32 extended from the main body 23 to travel on the rails 17a by means of driving force of the main body 23 while pressing a guiding plate 37 having a guiding groove 36 which corresponds to the width and thickness of the backing tape 35 onto the welding line by a pair of front and rear links 34a, 34b having a spring 33 therebetween, similar to the facilities 23. Thereby, the backing tape 35 is developed appropriately and pressed to the reverse side corresponding to the welding line without furrows or folding by means of the cooling copper plate. FIGS. 8, 9 and 10 show further details of the backing tape mechanism. Its main body is indicated with a numeral 37, the end portion of which is formed with a tape guiding groove 36, and it is preferable that this groove is slanted and its end is curved. With this arrangment, smooth sliding may be insured even if a material 24a to be welded is uneven. FIG. 10 is an embodiment showing one example of the above mentioned tape guiding mechanism. The tape guiding mechanism 31 is prepared as an auxiliary mechanism positioned prior to the backing mechanism 23, and it travels on the same rails due to self-running of the backing mechanism 23 via the bar 32. Such an auxiliary mechanism 31 and its association with the backing mechanism have been illustrated merely as one example and of course other means may be employed. In summary, it makes the welding easy and stable to have the tape guiding mechanism precede the backing mechanism in the direction of movement thereof. According to such a formation, the tape guiding plate 37 is sliding by self-running of the backing mechanism 23 while pressing the backing tape 35 set on the reverse side 38 of the welding edge of the material to be welded. The groove 36 at the end of the guiding plate 37 exactly guides a tape 35, even if it happens to have a flexion 35a, to insert it between the guiding plate 37 and the plate 24 to be welded. For welding a curved path, it appropriately guides the tape to set a width center of the tape onto the reverse side of the welding edge. (With respect to details of the tape guiding mechanism, shown in FIGS. 7 and 10, various reference numerals and the explanation concerned are omitted, since the elements were described above with reference to the motor driving mechanism.) The above mentioned tape guiding mechanism is one of the peferable embodiments to make the welding operation easy and stable for applying the basic structure as shown in FIG. 4 to an actual working arrangement. The preferable embodiment is not limited to the said tape guiding mechanism. A backing apparatus as required for forming a reverse bead in the one-side welding operation. The conventional backing metal for forming a reverse bead has been a rectangular block being high in heat conductivity such as aluminum, copper and the like, and has been pushed to the reverse side of the material to be welded by means of supporting material and elastic material suspended from the welding apparatus through the welding edges. However, since the shape has been rectangular and when the material to be welded has been not smooth, or has been uneven, the backing metal has been caught at its front portion by such unsmooth or uneven portions to prevent sliding. Further, since the backing mechanism suspended the supporting material through the welding edges from the welding machine at the upper portion, fixing means such as fixing pieces or magnets were arranged between the materials to be welded in order to keep a space between the edges, and a measure for preventing the material to be welded from distortion by heat was needed. Therefore, the prior art mechanism was complicated, and it was demanded to carry out tack welding to the welding edges to remove the fixing means. According to the proposed backing apparatus of the present invention shown in FIG. 4, difficulties involved in the prior art will be all removed to provide the stabilized reverse bead. Embodiments of the backing apparatus for forming the reverse bead are shown in FIG. 11 to 17.

FIG. 17 shows schematically the backing apparatus, omitting detailed parts (concretely the structure shown in FIG. 4 is applied to this arrangement also). The backing metal 5 for the reverse bead is pressed by a spring 60 against the reverse side of the material 35, which is made of a metal such as copper or aluminum and is arranged substantially. A portion 52 of backing metal 51 is bent downwards at the end portion of the backing metal 51. A bending angle of about 6° to the horizontal direction is preferred for smooth travelling. A groove 52a is optionally formed in said bent portion 52. An arc detecting portion 53 having a detecting element for arc light or arc heat, which is shown in detail in FIG. 16, is provided. Also as shown in FIG. 16, a little hole 61 is perforated toward an upper face of the backing metal 51 over which a heat resistable and penetrating substance, for example, mica 62 is provided. This mica 62 is secured to the backing metal 51 by pressing a hollow tube 63 upwards and by screwing 66a, 66b stopper 65 fixed with a light penetrating element 64 such as a Cds cell or a photo-transistor. This detecting arrangement may be, if necessary, equipped with a sensing element detecting temperature equivalent to the thermal electricity. In either way, a welding truck 57 shown in FIG. 17 has a travelling motor 58 which is controlled by a controller (not shown) to always meet the arc welding by the arc detecting part 52. As shown in FIGS. 11-15, the backing apparatus is furnished with a cooling water inlet pipe 55a and a outlet pipe 55b extending from a cooling water tank 54, and is furnished with a positioning means 56 to engage with a receipt portion designed in a suitable manner for a supporting body of the truck 57.

Depending upon which of the above mentioned backing apparatus, is used in relation with the basic structure shown in FIG. 4, many advantages may be realized with the present invention. The provision of the arc detector enables detecting the arc position following it. Accordingly, tack welding to the edges is possible and the fixing means as required by the prior art is no longer necessary. Further, the apparatus of the present invention may serve as a backing tape mechanism as shown in FIG. 7. In other words, the auxiliary truck for the backing tape shown in FIG. 10 is not required but this apparatus may be employed for guiding the tape as well as forming the reverse bead. In this instance, the advantages concerned with FIGS. 7 to 10 can be provided.

With respect to a guiding mechanism for the backing tape, further detailed information has been omitted, since such a structure is sufficient which removes the motor driving mechanism from the backing metal mechanism. But at the present time, it will be discussed in connection with a concrete embodiment to define the features thereof. FIG. 18 shows a perspective outline of the whole of a self-running one-wide welding apparatus connecting the backing metal apparatus shown in FIG. 4 and the tape guiding apparatus shown in FIG. 4 (corresponding to connection of that of FIG. 4 to the apparatus of FIG. 10). The backing metal apparatus 23 mounting the cooling copper plate 2 thereon is connected to the preceding tape guiding apparatus 31 mounting the tape 35 and the guiding plate thereon via a link bar 32. These units can run by themselves by means of the motor 16 on the rails 17a, 17b which are attached to the materials 24a, 24b by the magnets 20a, 20b, 20c, 20d, and they are exactly guided under the butting edges 38 as being met with the welding progress by a running controller 39. This is the featured mechanism of the invention when using the backing tape.

In the above mechanism, at least the following two points are required for actual working. The first point is a positioning of the backing tape guiding plate and the second point is a controlling of the running speed to keep pace with the welding progress. FIG. 19 is one example explaining the outline of the embodiment. Fillers 42 are charged into the butting edge 38 (FIG. 18) of the materials 24a, 24b from a filler container 41 positioned prior to the truck 40. For the filler, powder iron or cut wire are in general used onto which the arc is applied by a preceeding electrode 43 and a following electrode 44. In this welding operation, the fillers drop from the reverse of the edge. In the invention, such dropping is prevented with the backing tape guiding mechanism of FIGS. 8 to 11. This is another service and merit according to said mechanism.

A controlling of the self-running speed is effected by the controller 39 shown in FIG. 18. In the preferred embodiment, the backing metal member 2 is provided at its end portion with the arc detecting element 53 shown in FIG. 11 which is shown for example, in FIG. 16. An arc detecting signal thereby is fed to the controller 39 for controlling the running speed.

The positioning of the whole connected apparatus is carried out by the preceding backing tape guiding mechanism. FIGS. 20 to 22 show this mechanism with which the positioning means is associated, being similar in plan view to that of FIG. 7. The materials 24a, 24b, backing tape 35, guiding plate 37 and tape inserting groove 36 are the same as those in FIG. 9. A mechanism 31 supporting and sliding this guiding plate comprises upper members 102b, 102d rotatably suspending upper wheels 101c, 101d, 101g, 101h, lower member 102a, 102c rotatably suspending lower wheels 101a, 101b, 101e, 101f, and springs 103a, 103b elastically supporting the backing plate 37. These upper and lower members are connected by rods 104a, 104b, 104c, 104d, having springs for adjusting the force holding the rails 17a, 17b. The said members are centrally fixed with a concave block 107 through which a guiding pin 106 extending from a backing tape guiding supporter 105 is passed. Both sides of the concave block 107 are provided with supporters 109a, 109b of levers 108a, 108b whose end portions are bent to be inserted into the concave portion of the block 107 and are fixed with pins 110a, 110b. The levers 108a, 108b are in central portions pivotally connected with links 111a, 111b by means of pins 112a, 112b at one end of the links 111a, 111b. The other ends of the links are pivoted to the backing tape guiding supporter 105, and springs 113a, 113b are expanded between said pins. The other end portions of the levers are bent and at least one of them is provided with a screw 114. Further in this embodiment, there is furnished a supporting plate 115 for fitting the backing tape guiding supporter 105. The supporting plate 115 is connected with a tape guiding plate 37 by a pin 116 for positioning the guiding plate 37. The above explanation is concerned with the pushing up mechanism of the tape guiding plate shown in FIG. 7.

The action of the pushing up mechanism is the same as described in connection with the embodiment shown in FIG. 4.

The self-running apparatus according to the invention travels on the rails attached by the magnets to the materials to be welded. In the welding operation, the preferred embodiment of the attaching and supporting mechanism should be selected in view of the welding length. FIGS. 23 to 25 show such an embodiment. Under magnets 20a, 20b there are fixed supporting plates 73a, 73b by bolts 72a, 72b, 72c, 72d via spacers 71a, 71b, 71c, 71d. The supporting plates 73a, 73b are furnished with tubular connecting metal pieces 74a, 74b by means of bolts 75a, 75b, and supporting metal pieces 76a, 76b are laterally provided to the connecting metal pieces 74a, 74b. These supporting metal pieces are formed with perforations at central portions into which rods 78a, 78b having receiving metal pieces 77a, 77b are fitted to engage with said supporting metal pieces by pins 79a, 79b. In this connection, the supporting metal pieces 76b is formed with an oblong hole 80 for adjusting movement of said rod 78b to regulate the distance between the rails. Said receiving metal pieces 77a, 77b are formed with V-shaped members 81a, 81b into which metal pieces 82a, 82b held by the rails are fitted. The metal pieces 82a, 82b are furnished with pressing members 83a, 83b, and these pressing members 83a, 83b are restrained in rotation by means of operating rods 85a, 85b passing within said metal pieces 82a, 82b via springs 84a, 84b, as well as restraint from jumping upwards by means of nuts 86a, 86b. Under the operating rods 85a, 85b, cam levers 87a, 87b are rotatably pivoted by said pins 79a, 79b. End portions of the cam levers 87a, 87b are an eccentric cam mechanism, and in the solid lined state as shown the operating rods 85a, 85b are pulled downwards and in the dotted lined state the operating rods are pulled upwards by said springs 84a, 84b. In accordance with the horizontal rotation of the levers 87a, 87b the operating rods 85a, 85b are rotated, so that the pressing members 83a, 83b are horizontally rotated as shown with the dotted line in FIG. 25 to release pressing of the members 82a, 82b.

In summary, the magnet attaching to the material to be welded is fixedly provided with the operating rod mechanism having the lever mechanism which may be selectively operated in the vertical movement and in horizontal rotation, and the members attached to the rail are engaged with said operating rod mechanism detachably in accordance with the horizontal movement of the lever. If such a means is added which enables a horizontal movement while said operating rod mechanism is being engaged with the rail, a fine adjustment may be provided to the distance between the rails to bring about smooth travelling, and exact positioning of the various mechanisms.

The present invention is not limited to the embodiments described above.

We claim:

1. A self-running one-side welding facility for welding together butted edges of material to be welded, comprising:
    at least two spaced guiding rails;
    magnetic means for magnetically attaching said guiding rails to said material to be welded and for suspending said guiding rails from one side of said material to be welded in the vicinity of said butted edges;
    a motor driven means including means for mounting a backing metal material against the butted edges to be welded, said motor driven means including means for suspending same from said guiding rails such that said backing metal mounting means is self-running along said guiding rails; and
    means coupled to said guiding rails and motor driven means for pushing said backing metal against the butted edges of the material to be welded, said pushing means comprising a link mechanism having a pair of pivotally mounted links coupled to said backing metal, and spring means connected to said links for applying a force to said links for pushing said backing metal against said butted edges of the material to be welded.

2. A welding facility according to claim 1 wherein said link mechanism is pivotally coupled to said motor driven means and is pivotally coupled to said backing metal.

3. A welding facility according to claim 2 wherein said link mechanism comprises two pairs of links, the links of each pair being pivotally connected to each other as well as to said motor driven means and backing metal.

4. A welding facility according to claim 3 wherein said spring means is mounted between the pivotal connections of the links of each pair of links.

5. A welding facility according to claim 4 wherein said spring means biases said pivotal connections toward each other.

6. A welding facility according to claim 1 wherein said spring means is connected between said links.

7. A welding facility according to claim 1 conprising two spaced guiding rails, said guiding rails being magnetically suspended from said material to be welded with said butted edges of said material interposed therebetween.

8. A welding facility according to claim 1 wherein said guiding rails are magnetically suspended from the underside of said material to be welded.

9. A welding facility according to claim 8 wherein said pushing means pushes said backing material against the butted edges of the material to be welded without being coupled to a pushing surface spaced from said guiding rails and spaced from the portions of said material defining said butted edges to be welded.

* * * * *

UNITED STATES PATENT AND TRADEMARK OFFICE
CERTIFICATE OF CORRECTION

PATENT NO. : 4,061,262
DATED : December 6, 1977
INVENTOR(S) : Hirokazu NOMURA et al It is certified that error appears in the above-identified patent and that said Letters Patent are hereby corrected as shown below:

On the initial page of the patent, change the Foreign Application Priority Data to read as follows:

--April 23, 1975    Japan............ 50-49531
  April 22, 1975    Japan............ 50-54118 [U]
  April 22, 1975    Japan............ 50-54119 [U]
  April 24, 1975    Japan............ 50-56266 [U]
  July 10, 1975     Japan............ 50-95127 [U]

Signed and Sealed this

Twenty-eighth Day of March 1978

[SEAL]

Attest:

RUTH C. MASON
Attesting Officer

LUTRELLE F. PARKER
Acting Commissioner of Patents and Trademarks